United States Patent [19]
Morimoto et al.

[11] Patent Number: 5,138,463
[45] Date of Patent: Aug. 11, 1992

[54] DOUBLE DECKER HOUSING AND PAPER HANDLING DEVICE FOR FACSIMILE APPARATUS

[75] Inventors: Hiroshi Morimoto, Sakurai; Tomomi Izumi, Ikoma, both of Japan

[73] Assignee: Sharp Kabushiki Kaisha, Osaka, Japan

[21] Appl. No.: 577,743

[22] Filed: Sep. 5, 1990

[30] Foreign Application Priority Data

| Sep. 7, 1989 | [JP] | Japan | 1-105965[U] |
| Sep. 7, 1989 | [JP] | Japan | 1-233765 |
| Sep. 7, 1989 | [JP] | Japan | 1-233766 |
| Sep. 7, 1989 | [JP] | Japan | 1-233767 |
| Sep. 7, 1989 | [JP] | Japan | 1-233768 |

[51] Int. Cl.⁵ .................. H04N 1/23; G01D 15/28
[52] U.S. Cl. .................. 358/296; 358/496; 346/136
[58] Field of Search .............. 358/296, 496; 346/136

[56] References Cited

U.S. PATENT DOCUMENTS

| 4,833,487 | 5/1989 | Koyanagi et al. | 346/136 X |
| 4,887,168 | 12/1989 | Endo et al. | 358/296 X |
| 4,910,602 | 3/1990 | Sakuragi | 358/296 |
| 4,914,525 | 4/1990 | Abe et al. | 358/296 X |

FOREIGN PATENT DOCUMENTS

| 61-299846 | 4/1986 | Japan |
| 62-2553 | 5/1987 | Japan |
| 62-127160 | 8/1987 | Japan |
| 64-56439 | 4/1989 | Japan |

*Primary Examiner*—Joseph W. Hartary
*Assistant Examiner*—Eric Frahm
*Attorney, Agent, or Firm*—Nixon & Vanderhye

[57] ABSTRACT

A facsimile apparatus of the type having a facsimile body and a paper having separately, including a double-decker structure of an original document transporting system for transporting an original document to read out original information therein to be transmitted and a paper feeding system for feeding paper to record transmitted information thereonto.

3 Claims, 14 Drawing Sheets

DOUBLE DECKER HOUSING AND PAPER HANDLING DEVICE FOR FACSIMILE APPARATUS

BACKGROUND OF THE INVENTION

1. Field of the Invention

The present invention relates to a facsimile apparatus of the type having a facsimile body and a paper housing separately.

2. Description of the Prior Art

Conventionally, such a facsimile apparatus as shown in FIG. 19 is known as a facsimile apparatus of the type having a facsimile body and a paper housing separately.

The facsimile apparatus is separated into a facsimile body 1 and a paper housing 2 for minimization. The paper housing 2 is provided with a pivotally movable cover 3 which allows an operator to confirm the size of paper 4 in a roll form when opened. The paper 4 is housed within a casing 5 of the housing 2 and is in contact with a chamber wall 5a thereof. A paper feeding system 6 feeds the paper for recording received information thereonto, while an original document transporting system 7 transports an original document 10 for reading out original information therefrom to be transmitted. There are provided a recording head 8, an optical system 9 and an original document setting tray 11.

In the prior art facsimile apparatus of the above construction, the paper feeding system 6 and the original document transporting system 7 are disposed in side-by-side relation. Accordingly, the size of the apparatus in the paper moving direction can be minimized if the paper housing 2 is detached, whereas the size in the direction orthogonal to the above direction, i.e., in width cannot be minimized. Therefore, it has been desired to minimize the facsimile body 1 in width for minimizing the facsimile apparatus as a whole.

For minimizing the facsimile body 1, the original document setting tray 11, which is disposed on the upper face of the body 1 and has a sufficient width, must also be minimized. However, the tray 11 is required to have a sufficient width for setting the original document. Therefore, it has been also desired to improve the tray 11 without minimizing in its width.

Accordingly, an object of the invention is to provide a facsimile apparatus of the type having a further minimized facsimile body and a separate-type paper housing.

SUMMARY OF THE INVENTION

According to the invention, there is provided a facsimile apparatus of the type having a facsimile body and a paper housing separately, comprising a double-decker structure of an original document transporting system for transporting an original document to read out original information therein to be transmitted and a paper feeding system for feeding paper to record transmitted information thereonto.

The facsimile apparatus of the invention has a double-decker structure of the original document transporting system and the paper feeding system, so that the facsimile body can be minimized in width compared with the prior art facsimile apparatus in which the original document transporting system and the paper feeding system are disposed in side-by-side relation. Thus, the facsimile apparatus as a whole can be further minimized relative to the conventional one and easily displaced.

DETAILED DESCRIPTION OF THE PREFERRED EMBODIMENTS

Figure 1:
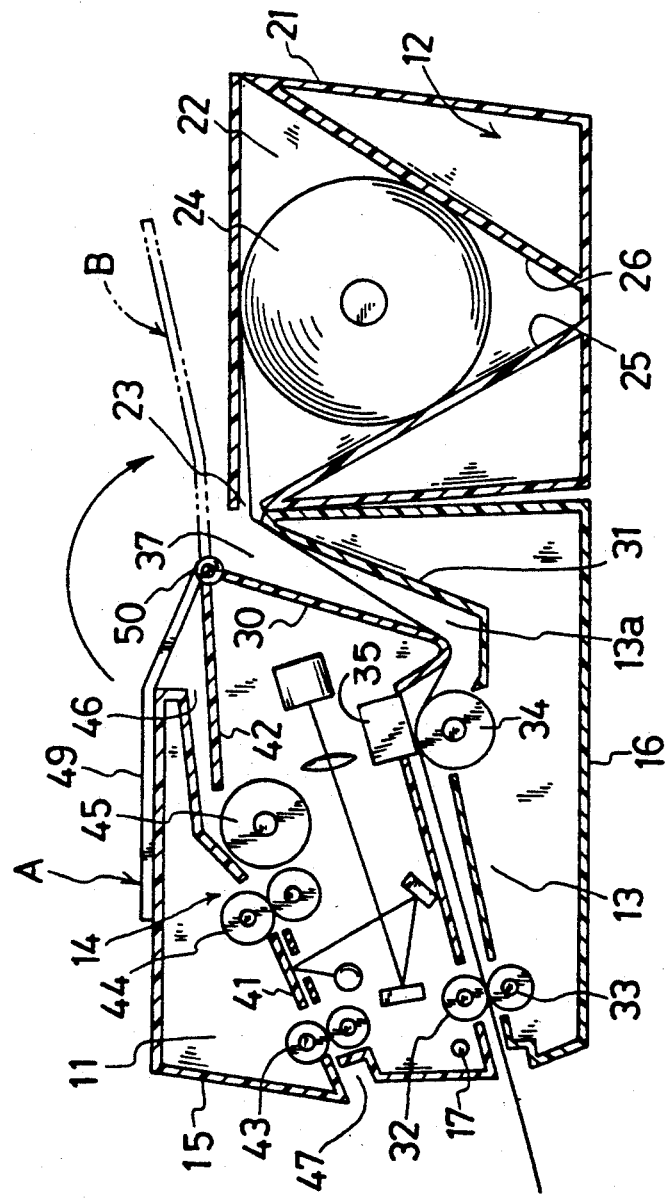
FIG. 1 is a sectional view showing an facsimile apparatus in operation of an embodiment 1 according to the invention.

In the present invention, the original document transporting system and the paper feeding system is positioned one above the other. Preferably, the former is disposed above the latter.

The original document transporting system consists of, for example, a guide plate for guiding an original document, an original document transporting roller, an original document transporting path and the like. On the other hand, the paper feeding system consists of, for example, a guide plate for guiding paper, a paper feeding roller, a paper feeding path and the like.

In the paper feeding system, preferably provided in the middle of the paper feeding path is a paper information recognizing means for recognizing the size and the like of the paper used. The paper to be used in the invention is preferably provided with an information holding portion at the top end thereof in which information such as the paper size is recorded. Thus, the paper size and the like can be read when the information holding portion of the paper passes the paper's information recognizing means provided in the paper feeding system, whereby the information such as paper size can be confirmed before the facsimile body receives transmitted information, and an error in setting paper can be prevented, resulting in high effectiveness in facsimile communication.

In the case of using a paper cartridge of a disposable type, it is possible that the user may set paper of a wrong size, because the paper cartridge is not provided with a lid to be opened to confirm the paper size. However, provision of the paper information recognizing means and information holding portion makes it possible to effectively prevent mistakes about the size of the paper.

It is also preferable to provide the paper information recognizing means on an inner surface of a wall of the facsimile body in the paper feeding inlet side. In this case, the information holding portion is provided on an outer surface of the cartridge body at a position corresponding to that of the paper information recognizing means. Thus, when the paper cartridge is attached to the facsimile body, the information holding portion approaches the paper information recognizing means thereby reading the information such as the size of the paper used. Consequently, the information such as the paper size can be confirmed before the facsimile apparatus receives transmitted information.

As has been described, it is preferable that the original document transporting system is positioned above the paper feeding system. In this case, it is preferable that the original document setting tray is pivotally provided in the upper portion of the facsimile body. When the original document setting tray is not in use, it can be folded in the facsimile body side to assume a non-use position, while when it is in use, it can be unfolded in the paper housing side to assume a use position. It is also preferable that the paper feeding inlet is defined in the facsimile body and positioned below the original document setting tray assuming its use position.

By virtue of the above construction, where desired information is to be transmitted with this apparatus, the original document setting tray is unfolded to assume its use position, then the original document transporting system and the optical system are actuated to realize a transmitting operation. If the tray is not collapsible and disposed above the facsimile body as a prior art apparatus, the tray must be too minimized in width in accordance with the minimized width of the facsimile body in which the original document transporting system and the paper feeding system are disposed in the double-decker construction, resulting in inconvenience for use. However, the original document setting tray according to the invention can be folded and unfolded to assume the non-use and use positions so that it is not necessary to minimize the tray in width. Therefore, the present invention can realize a convenient facsimile apparatus with its body minimized.

Further, it is preferable that the paper feeding path of the paper feeding system can be opened for setting paper. In this case, provided in the facsimile body are paper detecting means disposed adjacent the paper feeding path for detecting the presence of paper, open-close detecting means for detecting that the paper feeding path is opened or closed, and paper controlling means for automatically setting paper to a predetermined position by actuating a paper feeding mechanism on the basis of an open or close signal outputted from the open-close detecting means and a presence signal outputted from the paper detecting means.

In such a construction, when paper is set in the facsimile body, the paper feeding path of the facsimile body is first opened to introduce the paper housed in the paper cartridge over a platen roller to the paper feeding path, then the path is closed to enable the apparatus to receive and record transmitted information. Then, the open-close detecting means detects that paper feeding path is closed, and the paper detecting means detects the presence of the paper. On the basis of the presence signal outputted from the paper detecting means and close signal outputted from the open-close detecting means, the paper controlling means actuates the feeding rollers and the platen roller, whereby the paper can be automatically set to a predetermined position.

The facsimile apparatus of the invention uses preferably such a paper cartridge as to have a casing and a paper chamber defined within the casing for accommodating a roll of paper, the chamber being defined V-shaped with chamber walls thereof.

With the paper cartridge of the above construction, a paper roll can be supported at two points by the chamber walls forming the V-shape, whereby the paper supporting stability increases relative to a conventional cartridge. In addition, if the diameter of the roll decreases by using the paper, the paper roll can be supported in equilibrium with the help of the two-point support.

The chamber walls in a V-shape are preferably so constructed as to gradually rise as the diameter of the paper roll decreases. An elastic plate or the like may be provided to raise the chamber walls as the diameter and weight of the paper roll decrease, whereby the paper can be drawn from a paper outlet of the cartridge at a constant angle to assure the equilibrium of the paper roll.

The paper cartridge used in the present invention may be a replaceable type cartridge which allows replacement of paper or a disposable type cartridge. In the case of the latter, the free end of the paper is bonded with a member which is more solid than the paper, or is made thicker than other part of the paper. If thus constructed, the paper can be easily introduced between a pair of feeding rollers disposed in the facsimile body thereby to facilitate the paper setting.

EMBODIMENT 1

As shown in FIG. 1, a facsimile apparatus of the embodiment 1 has a facsimile body 11 and a paper housing 12 separately. In the facsimile body 11 provided are an original document transporting system 14 and a paper feeding system 13 in a double-decker structure.

Figure 2:
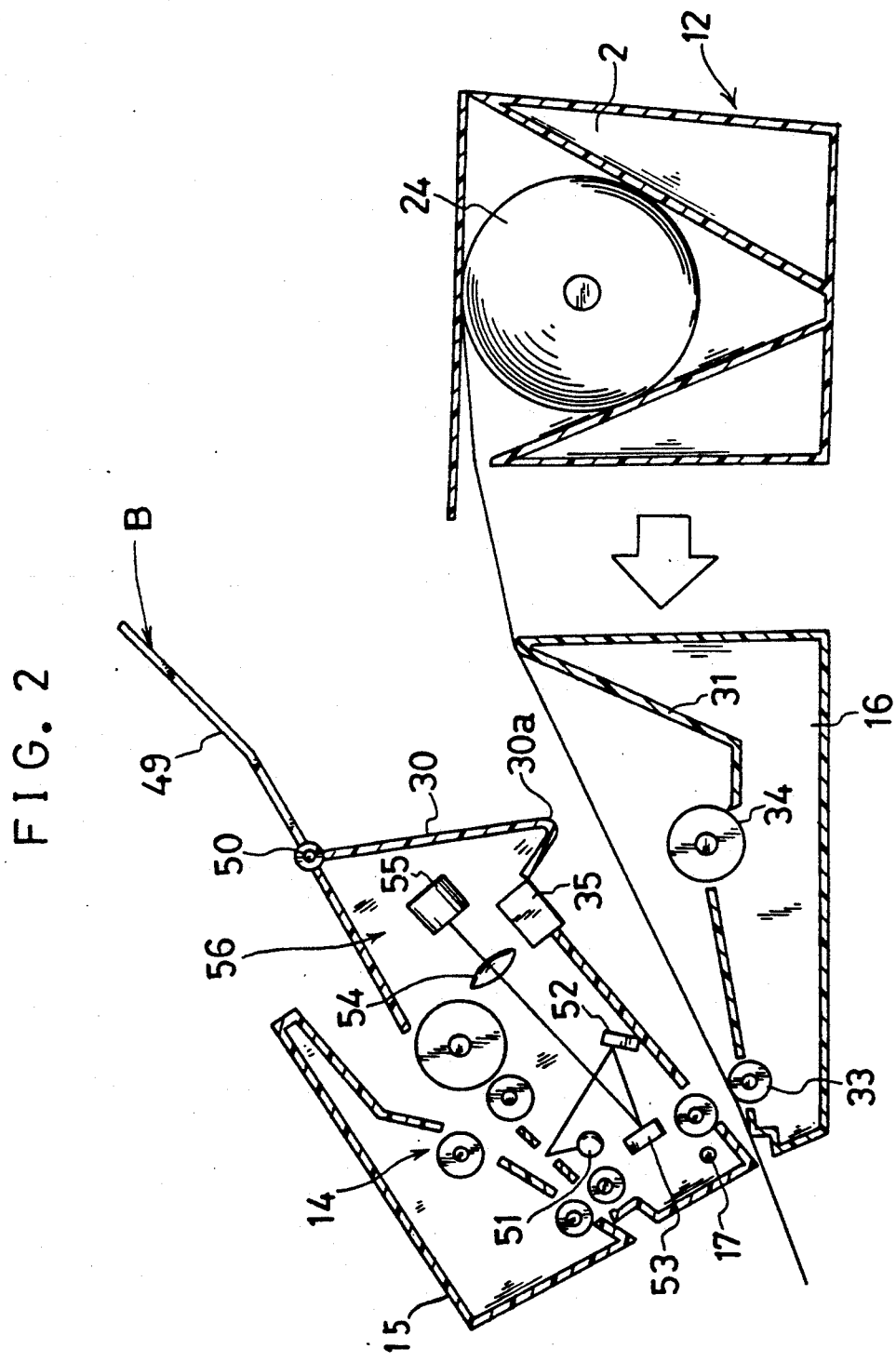
FIG. 2 is also a sectional view showing the same facsimile apparatus of which upper portion is opened to set paper.

As shown in FIG. 2, the above facsimile body 11 consists of an upper frame 15 and a lower frame 16 which can be split. The upper frame 15 is openably supported on the lower frame 16 via a transversal shaft 17.

The above paper housing 12 is a paper cartridge of disposable type and consists of a casing 21 in the form of a rectangular parallelepiped and a paper chamber 22 having a V-shape in section for accommodating paper which is defined inside the casing 21. In an upper end of the paper chamber 22 defined in the transversal direction is a paper drawing outlet 23. The reason why the paper chamber 22 is defined V-shaped in section is to assure the equilibrium of a paper roll 24 when the diameter of the paper roll 24 decreases. Chamber walls 25,26 constituting the V-shape of the chamber 22 can assuredly support the paper roll.

The paper feeding system 13 consists of a pair of upper and lower guide panels 30,31 for guiding the paper 24, a feeding path 13a interposed between the guide panels 30,31, a pair of upper and lower feeding rollers 32,33 disposed adjacent a paper ejecting outlet, and a platen roller 34 disposed nearer to a paper feeding inlet 37 than the feeding rollers 32,33. The upper guide panel 30 and the upper feeding roller 32 are mounted on the lower face of the upper frame 15, while the lower guide panel 31, the lower feeding roller 33 and the platen roller 34 being mounted on the upper face of the lower frame 16. A recording head 35 is disposed in the upper frame 15 in a position corresponding to the platen roller 34 mounted in the lower frame 16. The paper feeding inlet 37 is defined by the upper and lower guide panels 30,31 in the vicinity of the paper housing 12. The guide panels 30,31 are bent in the middle of the way from the paper feeding inlet 37 to the recording head 35 so that a constant tension can be given to the paper 24.

On the other side, the original document transporting system is disposed in the upper portion of the upper frame 15 and consists of a pair of upper and lower guide panels 41,42, two pairs of upper and lower transporting rollers 43,44, and a document supply roller 45 in contact with the upper guide panel 41. In the same manner as the paper feeding system 13, the upper guide panel 41 of the original document transporting system 14 can be opened.

A document supply inlet 46 defined by the pair of upper and lower guide panels 41,42 is formed in the upper face of the upper frame 15, while a document outlet 47 being formed in the side of the upper frame 15. A original document setting tray 49 which is slightly bent in section is provided adjacent the document supply inlet 46 of the original document transporting system 14. The original document setting tray 49 is pivotally supported by a transversal shaft 50 thereby changeably assuming a non-use position A in the facsimile body 11 side and a use position B to project from the facsimile body 11 in the paper housing 12 side. The paper feeding inlet 37 is covered by the original document setting tray 49 in the use position B.

Figure 3:
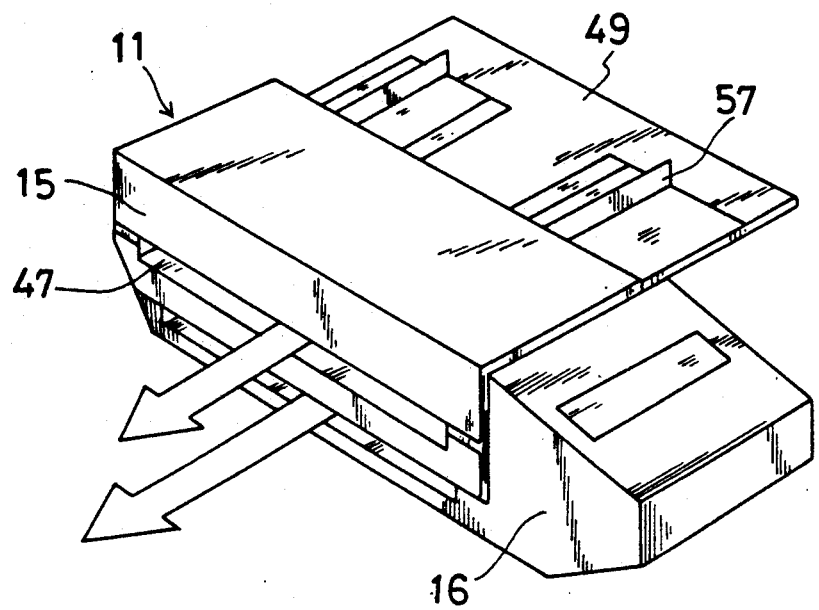
FIG. 3 is a perspective view showing the same facsimile apparatus in operation.
Figure 4:
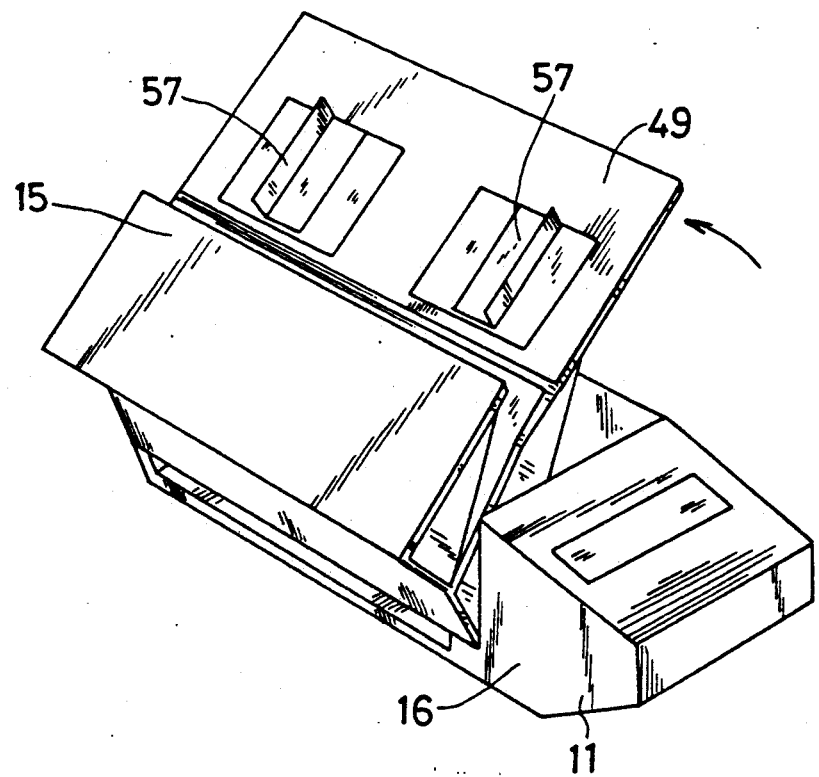
FIG. 4 is also a perspective view showing the same facsimile apparatus of which upper portion is opened.
Figure 5:
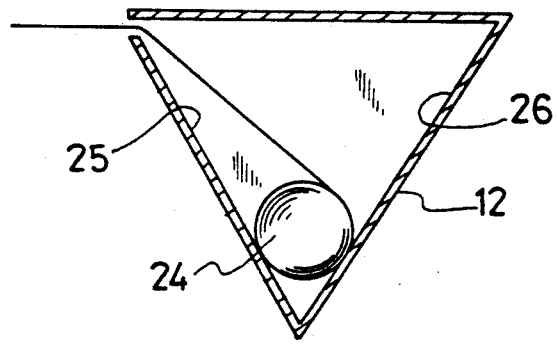
FIG. 5 is a sectional view showing a modified paper housing of the embodiment 1.
Figure 6:
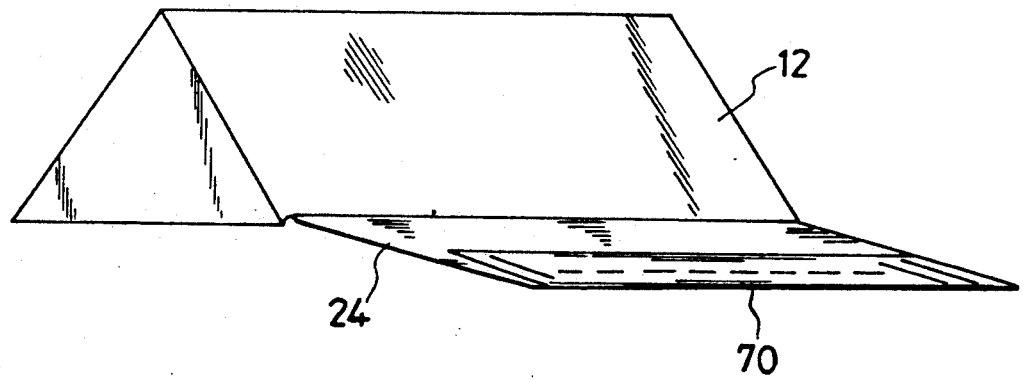
FIG. 6 is a perspective view showing the same modified paper housing.

An optical system 56 consisting of a light source 51, mirrors 52,53, lens 54 and a photo-electric converting element 55 is located below the original document transporting system 14. In FIGS. 3 and 4, 57 denotes a width adjusting guide.

In the above construction, where the paper 24 is to be set in the facsimile body 11, first the upper frame 15 of the facsimile body 11 is pivotally moved about the transversal shaft 17 to open the paper feeding system 13, then the paper 24 is set on the platen roller 34 and the feeding roller 33. Next, the upper frame 15 is closed to make the apparatus possible to receive and record transmitted information as shown in FIG. 1. In this case, the paper 24 is drawn out of the paper housing 12 of a disposable cartridge type, so that the setting operation of the paper 24 in the facsimile body 11 can be more easily performed than the case of setting in the facsimile body 11 a conventional well-packed paper roll 24 which should be unpacked when to be set.

Where desired information is to be transmitted using this facsimile apparatus, the original document setting tray 49 is unfolded to assume the use position B, then the original document transporting system 14 and the optical system 56 are actuated, whereby transmitting operation can be performed.

Further, where the facsimile apparatus is to be displaced, the paper 24 set in the facsimile body 11 should be rewound or cut off to separately displace the body 11 and the paper housing 12.

In the above embodiment, the original document setting tray 49 is pivotally provided about the transversal shaft 50. In an alternative embodiment, the original document setting tray may be rendered slidable along the upper face of the facsimile body 11.

The paper housing 12 is not necessarily in the form of a rectangular parallelepiped casing as in the above embodiment, which may be in the form of a triangular casing. The cartridge used in the present invention may be in any form provided that the paper roll 24 can be supported by chamber walls in a V-shape, for example, even a rectangular parallelepiped cartridge can support the paper roll 24 with its chamber walls forming a V-shape if it is tilted by 45 degrees when set to the facsimile body 11. Thus, depending on the cartridge setting manner, the same effect as in the above embodiment can be obtained.

EMBODIMENT 2

Figure 7:
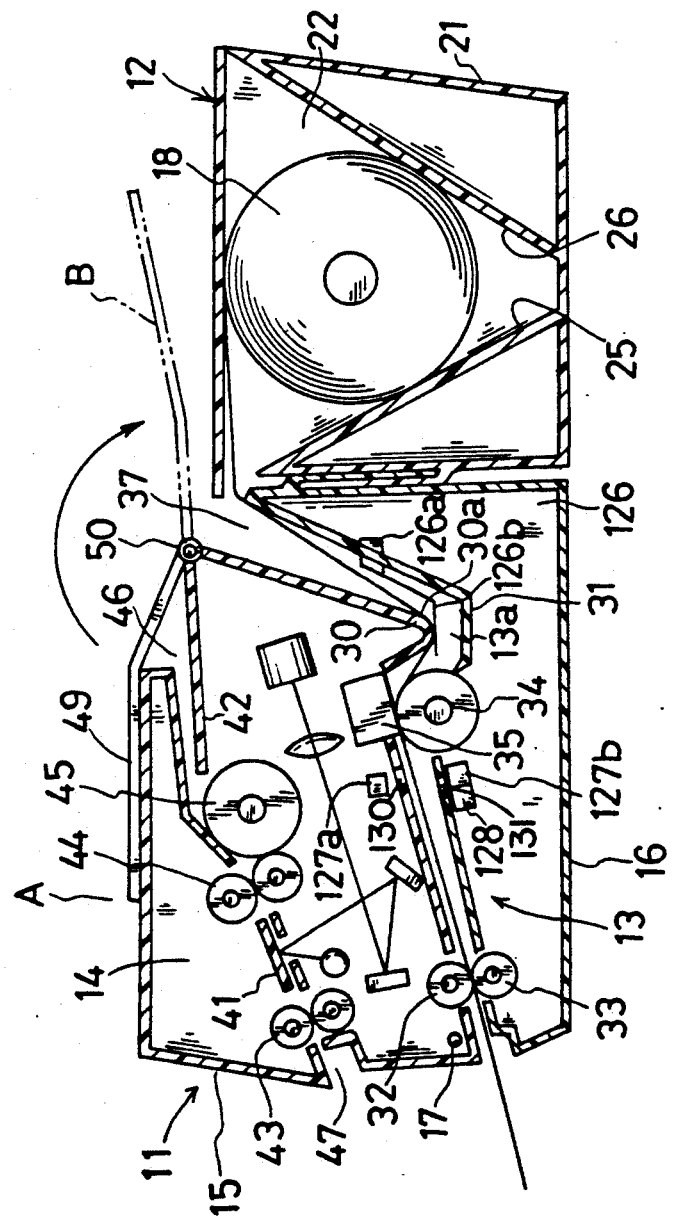
FIG. 7 is a sectional view showing a facsimile apparatus in operation of an embodiment 2 according to the invention.

An facsimile apparatus shown in FIG. 7 is provided with open-close detecting means 126 for detecting opening and closing movements of the upper frame 15. This detecting means 126 consists of a limit switch 126a which is fixed to a lower frame 16 and an operative segment 126b which is pressed by a V-shaped portion 30a of an upper guide panel 30 to turn on the limit switch 126a when an upper frame 15 assumes its closed position.

As well, a facsimile body 11 is provided with paper detecting means 127 for detecting whether a paper roll 18 is set or not. The paper detecting means 127 consists of a light-emitting element 127a disposed adjacent hole 130 in the upper frame 15 in a position nearer to a paper ejecting outlet than a recording head 35 and a light-receiving element 127b disposed in the lower frame 16 adjacent hole 131 in a position opposed to the light-emitting element 127a through the paper feeding path 13a.

Further, beside the light-emitting element 127b in the paper ejecting outlet side provided is an optical coupling device 128 also adjacent hole 131 and is the paper information recognizing means for recognizing the size of the paper 18 and the like. Still further, in the lower frame 16 in the paper cartridge 12 side formed is an inverted L-shaped engagement segment 149 for removably engaging with an engagement hole 148 formed in the wall of the paper cartridge 12.

Figure 8:
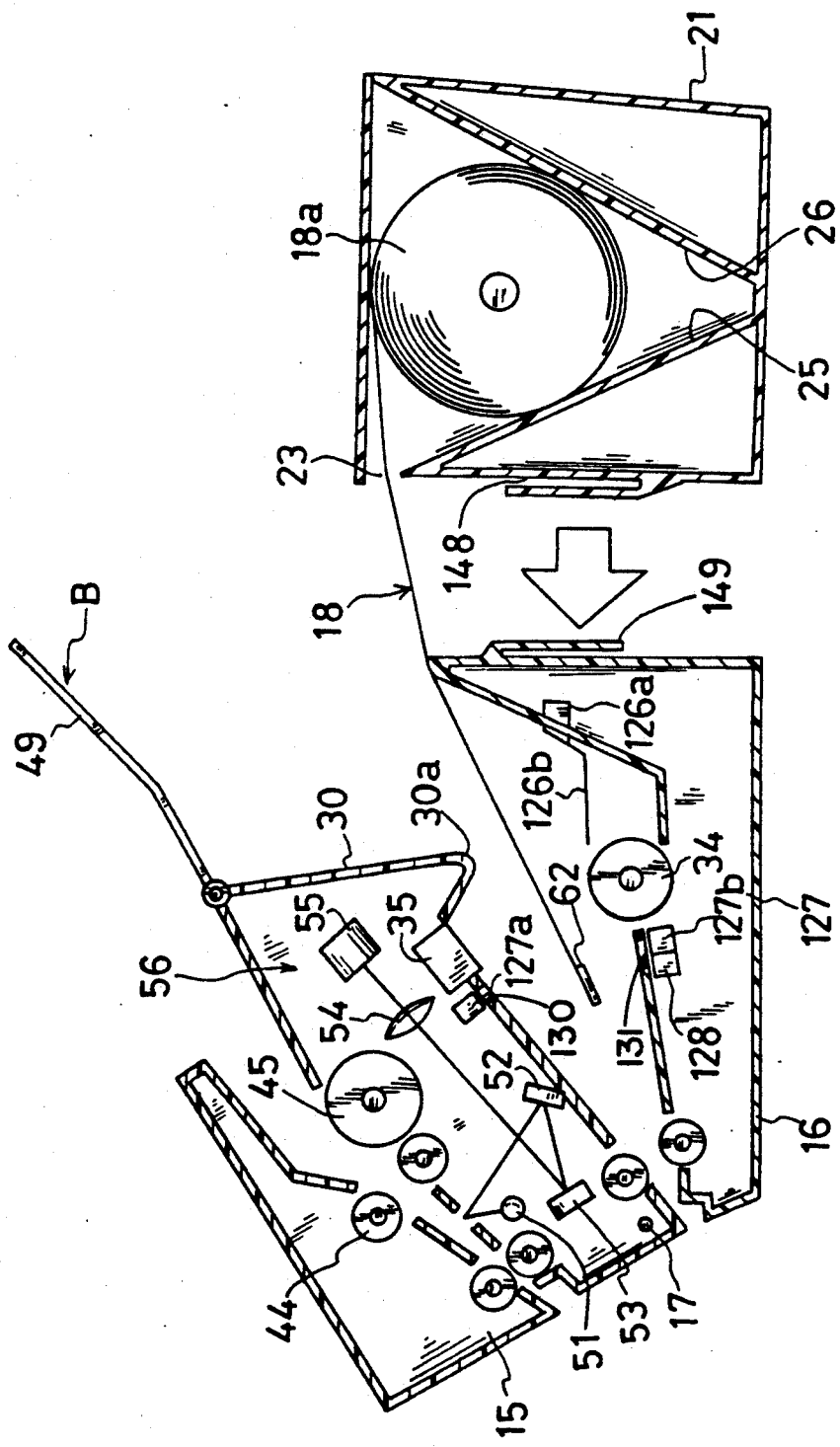
FIG. 8 is also a sectional view showing the same facsimile apparatus of which an upper portion is opened to set paper.
Figure 9:
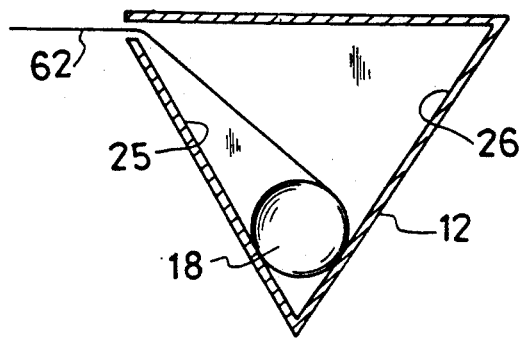
FIG. 9 is a sectional view showing a modified paper housing of the second embodiment.

Paper 18 consists of a paper body 18a in a roll form and an information holding portion 62 in which, for example, bar-coded information of the paper size is recorded, and which is bonded to a free end of the paper body 18a as shown in FIGS. 8 and 9.

In the above facsimile apparatus, when the upper frame 15 is closed to make the apparatus possible to receive and record transmitted information as shown in FIG. 7, the closing operation of the paper feeding system 13 is detected by the open-close detecting means 126. Subsequently, when the paper detecting means 127 detects the presence of the paper 18, a paper controlling means (not shown) actuates the feeding rollers 32,33 and the platen roller 34 to feed the paper 18 to a predetermined position on the basis of a presence signal and a close signal. At this time the information holding portion 62 of the paper 18 passes the paper's information recognizing means 128 of the paper feeding system 13, whereby the size and the like of the paper 18 now used are read, then displayed in a display portion (not shown). Thus, the information such as the size of the paper used can be recognized before the facsimile body 11 receives transmitted information, and setting paper 18 of a wrong size can be prevented thereby assuring remarkable effectiveness in facsimile communication.

Figure 10:
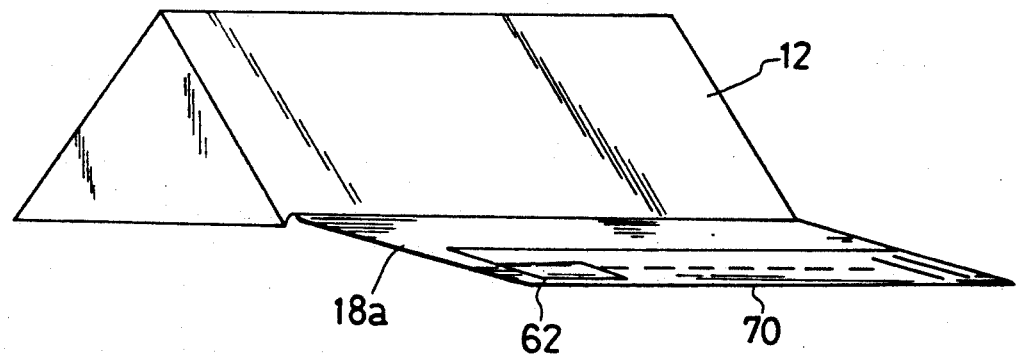
FIG. 10 is a perspective view of the same modified paper housing.

It should be understood that the free end of the paper 18 of a cartridge type may be bonded with a member 70 which is more solid than the paper 18 as shown in FIG. 10, or may be made thicker than other part in order to facilitate to set the paper 18 in the facsimile body 11.

EMBODIMENT 3

In an facsimile apparatus shown in FIGS. 11 and 12, an opening 227 is defined in the wall of a facsimile body 11 at a position below a paper feeding inlet 37. On the back of the opening 227 disposed is a light coupling device 228 as paper's information recognizing means for recognizing the size and the like of the paper 18.

Below a paper drawing outlet 23 of a casing 21 of the paper cartridge 12 at a position opposed to the light coupling device 228, bonded is an information holding portion 262 in which bar-coded information of the paper size and the like is recorded.

Figure 11:
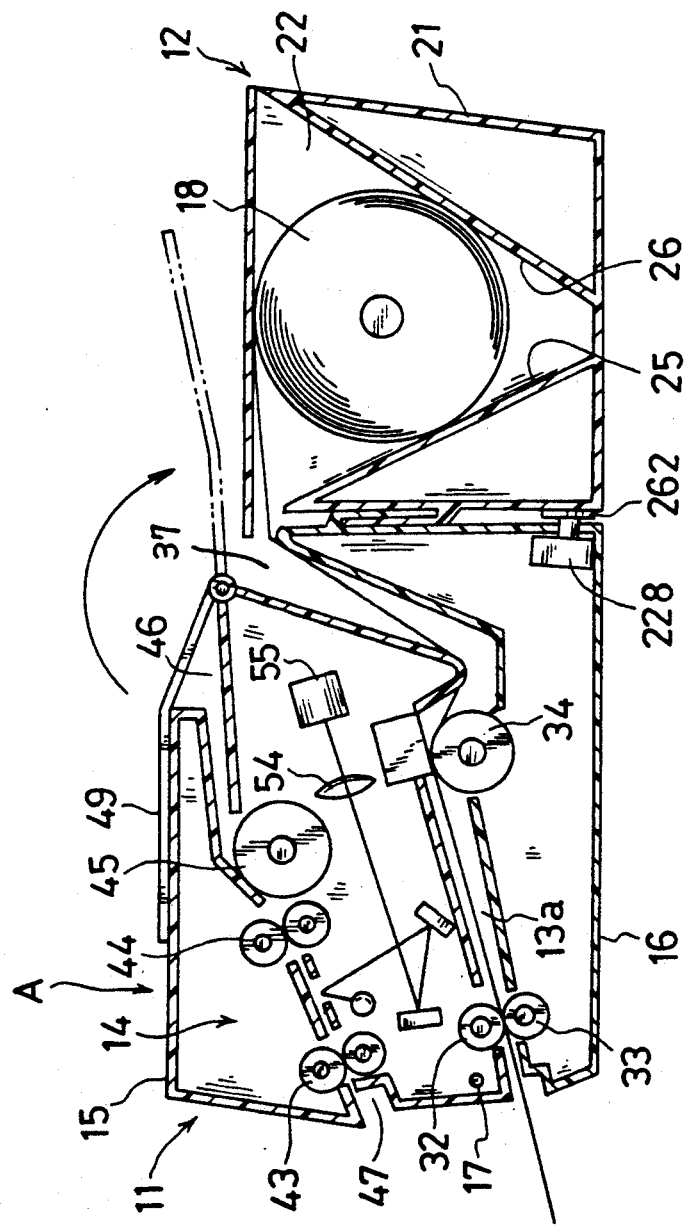
FIG. 11 is a sectional view showing an facsimile apparatus in operation of an embodiment 3 according to the invention.
Figure 12:
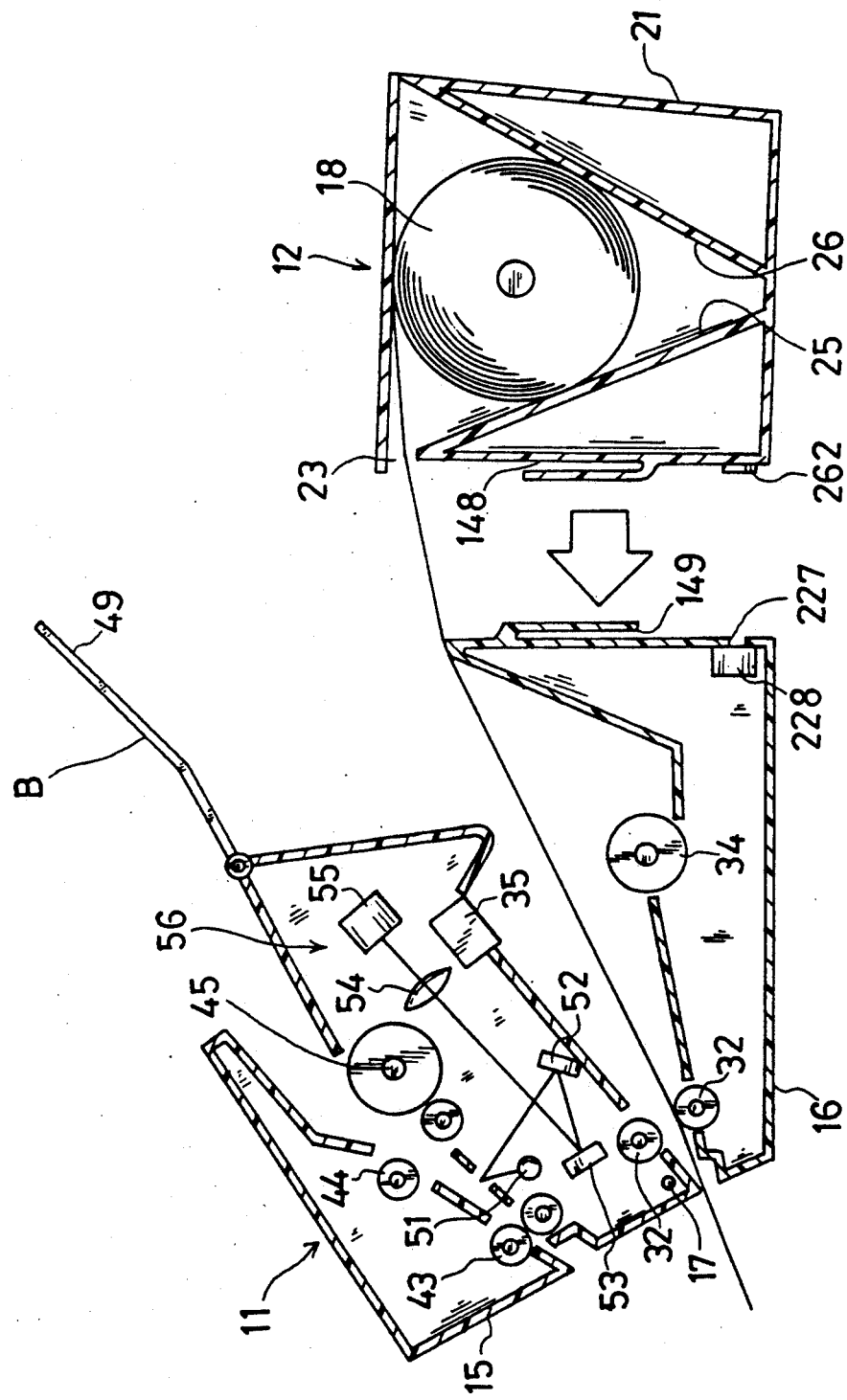
FIG. 12 is also a sectional view showing the same facsimile apparatus of which an upper portion is opened to set paper.

In the above facsimile apparatus, when the upper frame 15 is closed to make the apparatus possible to receive and record transmitted information as shown in FIG. 11, the information holding portion 262 of the paper cartridge 12 approaches the light coupling device 228 whereby the paper size and the like can be read through the opening 227, then displayed in a display portion (not shown). Thus, the information such as the size of the paper 18 used can be recognized before the facsimile body 11 receives transmitted information, and setting paper 18 of a wrong size can be prevented thereby assuring remarkable effectiveness in facsimile communication.

Figure 13:
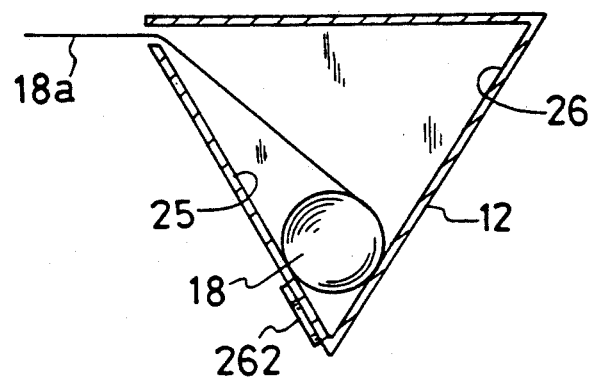
FIG. 13 is a sectional view showing a modified paper housing of the embodiment 3.
Figure 14:
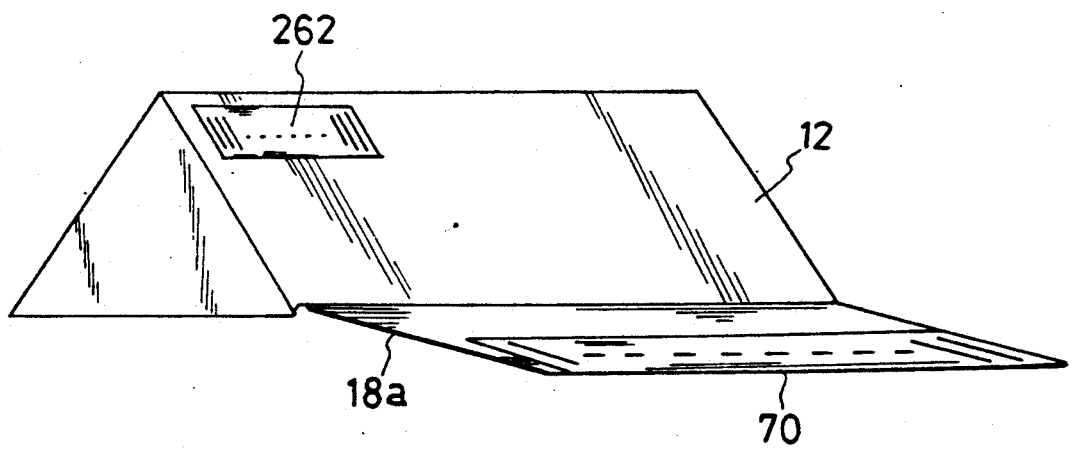
FIG. 14 is a perspective view of the same modified paper housing.

It should be understood that the paper cartridge 12 is not necessarily in the form of a rectangular parallelepiped as in this embodiment, which may be in a triangular form as shown in FIGS. 13 and 14.

EMBODIMENT 4

Figure 15:
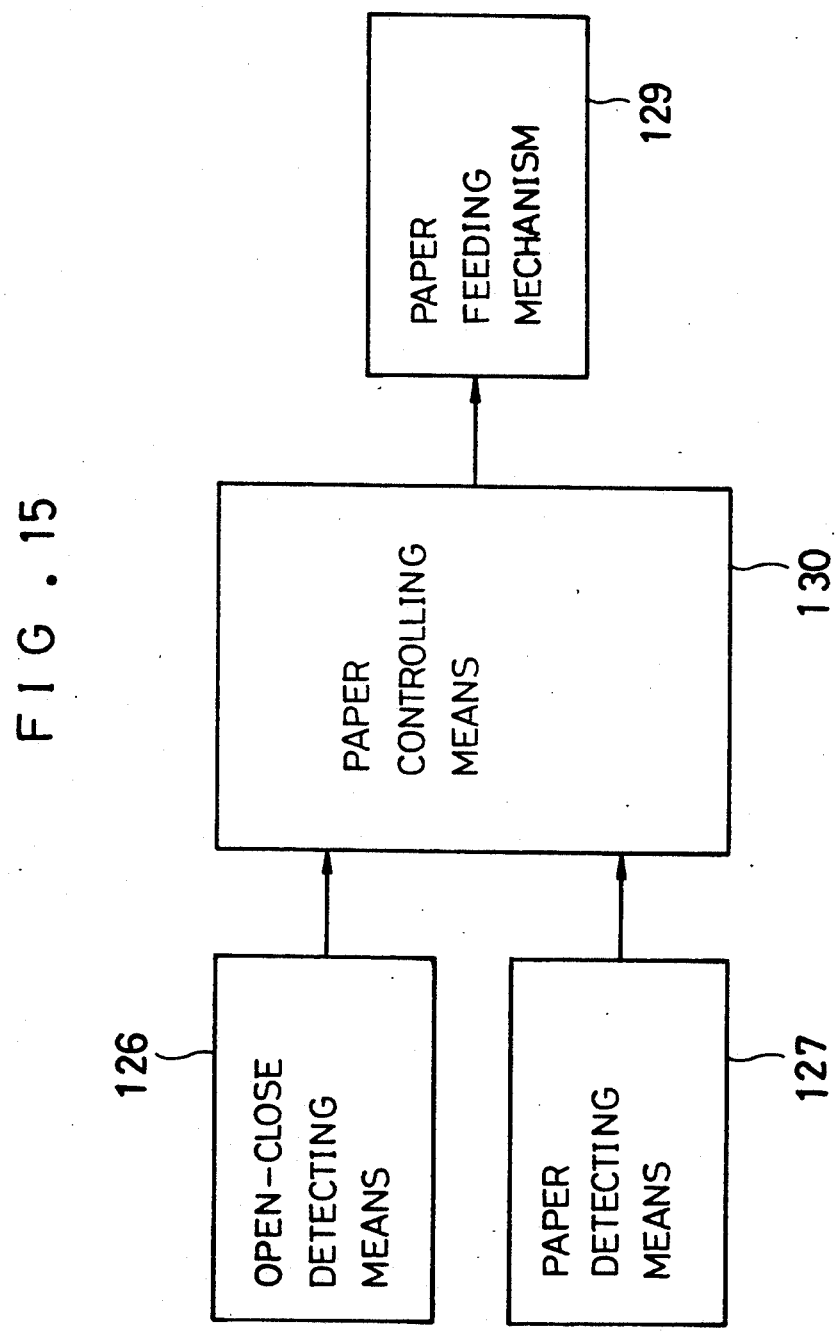
FIG. 15 is a block diagram for controlling an facsimile apparatus of an embodiment 4 according to the invention.

A facsimile apparatus shown in FIGS. 7, 8 and 15 is provided with paper controlling means 130 for automatically setting the paper 18 to a predetermined position by actuating a paper feeding mechanism 129 on the basis of signals outputted from open-close detecting means 126 and paper detecting means 127 respectively.

The paper feeding mechanism 129 consists of a platen roller 34, feeding rollers 32,33, a motor and a clutch, these rollers 32,33,34 being actuated by the motor. The paper controlling means 130 consists of a typical one-chip microcomputer having a RAM storing data, a ROM storing program, ALU and the like, and causes the platen roller 34 to rotate predetermined times on the basis of the signals from the open-close detecting means 126 and the paper detecting means 127.

It should be understood that the paper controlling means 130 may be so designed as to stop the paper feeding mechanism 129 on the basis of a stop signal when detecting means detects that the free end of the paper 18 reaches a predetermined position.

In the above facsimile apparatus, when the upper frame 15 is closed to make the apparatus possible to receive and record transmitted information as shown in FIG. 7, the closing operation of the paper feeding system 13 is detected by the open-close detecting means 126. Subsequently, when the paper detecting means 127 detects the presence of the paper, the paper controlling means 130 causes the paper feeding mechanism 129 to actuate the feeding rollers 32,33 and the platen roller 34 to automatically feed the paper 18 to a predetermined position on the basis of a presence signal and a close signal.

Thus, a manual operation by user for setting the paper 18 is not required, thereby considerably reducing possibility of feeding the paper 18 diagonally to the platen roller 34 by a manual operation and of paper jam.

EMBODIMENT 5

Figure 16:
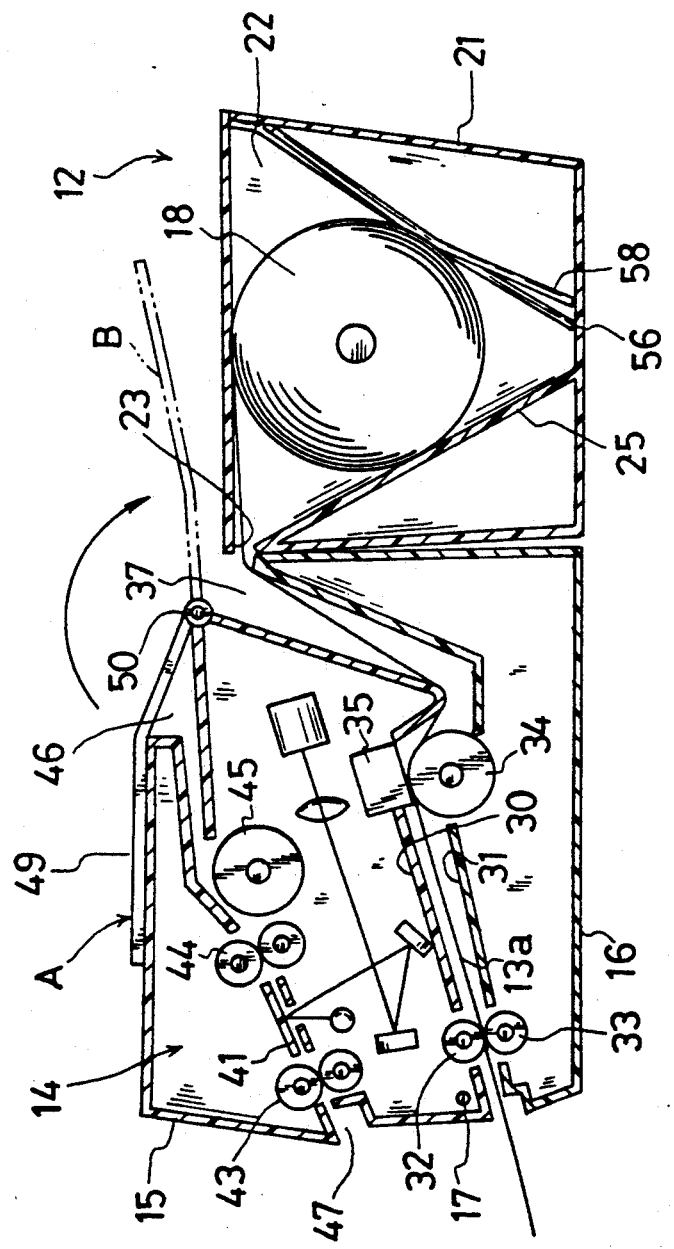
FIG. 16 is a sectional view showing a facsimile apparatus in operation of an embodiment 5 according to the invention.
Figure 17:
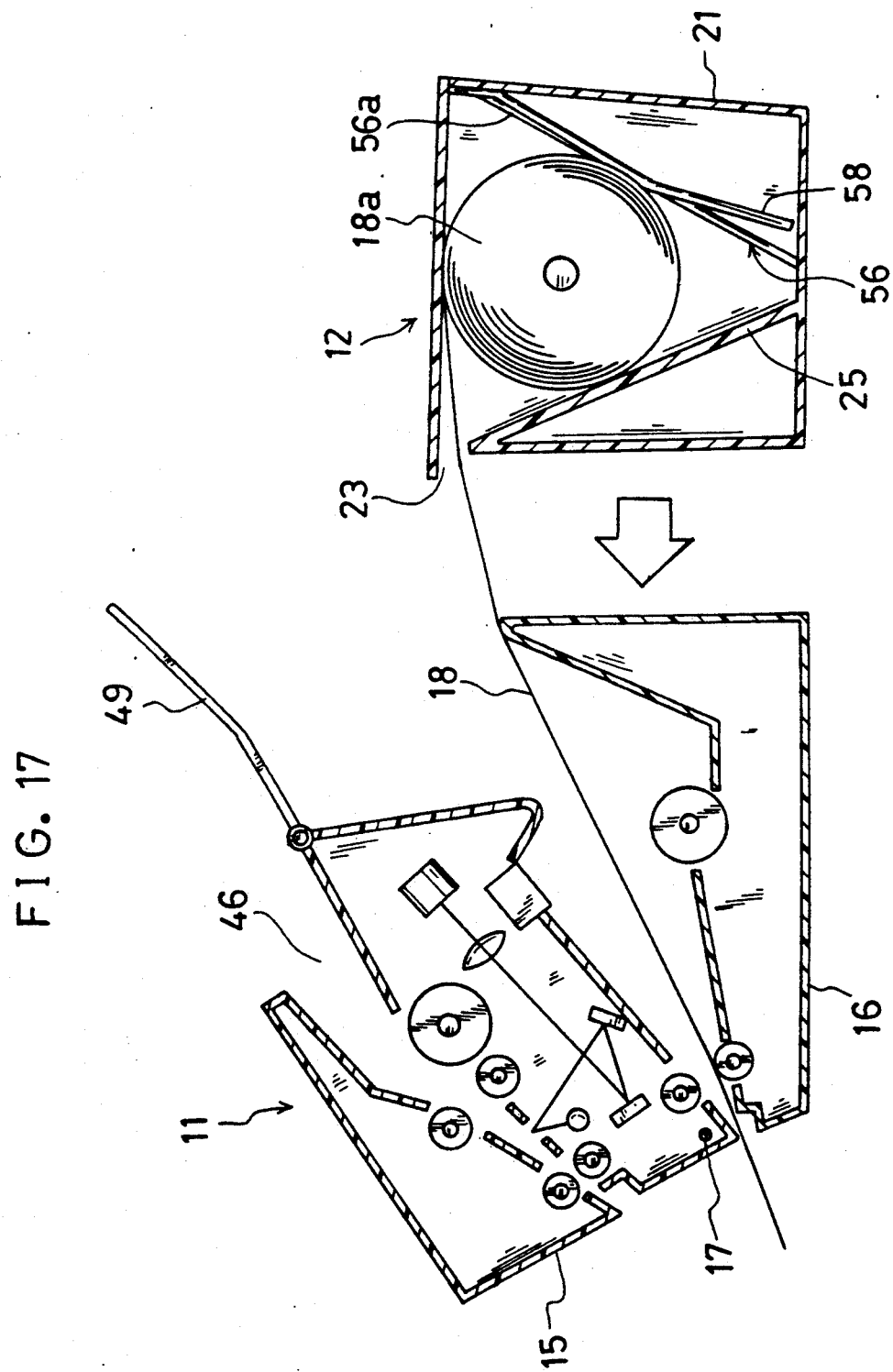
FIG. 17 is also a sectional view showing the same facsimile apparatus of which upper portion is opened to set paper.
Figure 18:
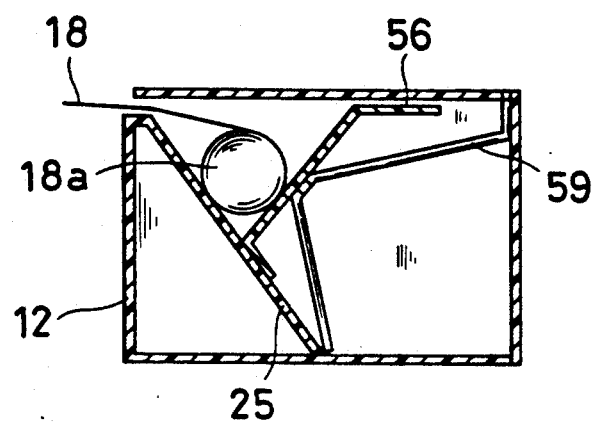
FIG. 18 is a sectional view showing a modified paper housing of the embodiment 5.
Figure 19:
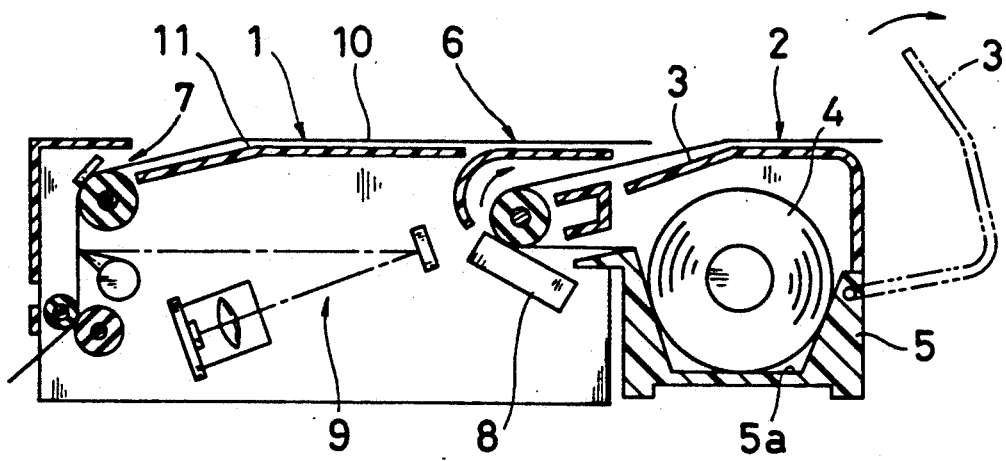
FIG. 19 is a sectional view showing a prior art facsimile apparatus.

In an facsimile apparatus shown in FIGS. 16 and 17, a paper cartridge 12 holds a paper roll 18 with its chamber walls 25, 56 constituting a V-shape. One chamber wall 56 consists of a fixed wall 56a and an elastic plate 58 which functions to raise the paper roll 18 through an opening defined in the fixed wall 56a, one end of the elastic plate 58 being fixed to an upper end of a casing 21.

In the above facsimile apparatus, the paper roll 18 housed in the paper cartridge 12 is always pressed up by the elastic plate 58. Accordingly, the elastic plate 58 of the chamber wall 56 raises the paper roll 18 as the diameter and weight of the paper roll 18 decrease, whereby the paper 18 can be drawn from a paper drawing outlet 23 of the cartridge 12 at a constant angle to assure the equilibrium of the paper roll 18.

In the above embodiment, the chamber wall 56 of the cartridge 12 consists of the fixed wall 56a and the elastic plate 58, which may, however, be provided with a bent leaf spring 59 to bias upwardly a slidable chamber wall 56 so that the slidable chamber wall 56 can move upwardly and downwardly along the other chamber wall 25.

While only certain presently preferred embodiments have been described in detail, as will be apparent with those skilled in the art, certain changes and modifications can be made without departing from the scope of the invention as defined by the following claims.

What is claimed is:

1. A facsimile apparatus comprising:
   a paper housing substantially enclosing a paper roll, and
   a double-decked facsimile body separably engaging said paper housing, said facsimile body comprising an original document transport system substantially above a paper feeding system receiving paper from said paper housing when said housing engages said body, said original document transport system comprises an original tray having a pivotable portion affixed to said facsimile body, and said tray overhanging said paper housing when in an in-use position and said tray folds over a portion of said facsimile body when in a non-use position, said portion defining an inlet opening to said original transport system.

2. A facsimile apparatus as in claim 1 wherein said tray is foldable, and said tray covers an original document inlet to said facsimile body when folded and said tray guides original documents into said inlet when unfolded.

3. A facsimile apparatus as in claim 1 wherein said tray pivots about said facsimile body.

* * * * *